(12) United States Patent
Kim et al.

(10) Patent No.: US 6,930,513 B2
(45) Date of Patent: Aug. 16, 2005

(54) SIMULTANEOUS BI-DIRECTIONAL SIGNAL TRANSMISSION SYSTEM AND SEMICONDUCTOR DEVICE THEREFOR

(75) Inventors: Jin-hyun Kim, Yongin (KR); Jung-hwan Choi, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 72 days.

(21) Appl. No.: 10/713,533

(22) Filed: Nov. 13, 2003

(65) Prior Publication Data

US 2004/0137676 A1 Jul. 15, 2004

(30) Foreign Application Priority Data

Dec. 20, 2002 (KR) .................................. 10-2002-0081736

(51) Int. Cl.[7] .............................................. H03K 19/00
(52) U.S. Cl. ............................. 326/60; 326/59; 326/86; 326/90
(58) Field of Search ........................ 326/59, 60, 62–63, 326/80–82, 86, 90

(56) References Cited

U.S. PATENT DOCUMENTS 5,325,355 A * 6/1994 Oprescu et al. ............. 370/282
6,639,423 B2 * 10/2003 Martin et al. ................. 326/30

* cited by examiner

*Primary Examiner*—Anh Q. Tran
(74) *Attorney, Agent, or Firm*—Mills & Onello LLP

(57) ABSTRACT

A simultaneous bi-directional signal transmission system includes a first semiconductor device, a second semiconductor device, and one or more transmission lines. The first semiconductor device includes a first output MUX which receives first binary data and converts the first binary data into a first signal having one of at least four levels; a first transmitter which is connected to the first output MUX and outputs the first signal via the transmission line to the second semiconductor device; a first receiver which compares one or more reference voltages selected by the first signal with a third signal input via the transmission line and outputs the comparison result; and a first input encoder which detects the second binary data based on the comparison result output from the first receiver. The second semiconductor device includes a second output MUX which receives second binary data and converts the second binary data into a second signal having one of at least four levels; a second transmitter which is connected to the second output MUX and outputs the second signal via the transmission line to the first semiconductor device; a second receiver which compares one or more reference voltages selected by the second signal with the third signal input via the transmission line and outputs the comparison result; and a second input encoder which detects the first binary data based on the comparison result output from the second receiver.

11 Claims, 16 Drawing Sheets

FIG. 2

En10(VDD) ——————————————————— VDD=10

――――――――――――――――――――― $\frac{5}{6}$VDD

En11($\frac{2}{3}$VDD) ——————————————————— $\frac{4}{6}$VDD=11

――――――――――――――――――――― $\frac{3}{6}$VDD

En01($\frac{1}{3}$VDD) ——————————————————— $\frac{2}{6}$VDD=01

――――――――――――――――――――― $\frac{1}{6}$VDD

En00(VSS) ——————————————————— 00

FIG. 3

| LTXL \ RTXL | En10 | En11 | En01 | En00 |
|---|---|---|---|---|
| En10 | 10(VDD) | $\frac{5}{6}$VDD | 11($\frac{4}{6}$VDD) | $\frac{3}{6}$VDD |
| En11 | $\frac{5}{6}$VDD | 11($\frac{4}{6}$VDD) | $\frac{3}{6}$VDD | 01($\frac{2}{6}$VDD) |
| En01 | 11($\frac{4}{6}$VDD) | 11($\frac{3}{6}$VDD) | 01($\frac{2}{6}$VDD) | $\frac{1}{6}$VDD |
| En00 | $\frac{3}{6}$VDD | 01($\frac{2}{6}$VDD) | $\frac{1}{6}$VDD | 00(VSS) |

| VOLTAGE | CONDITIONS |
|---|---|
| 10 | 10↔10 |
| VREF10L | 10//(10↔11) |
| 5/6VDD | 10↔11 |
| VREF11H | (10↔11)//{11v(10↔01)} |
| 11 | (11↔11)v(10↔01) |
| VREF11L | {11v(10↔01)}//{(11↔01)v(10↔00)} |
| 3/6VDD | (11↔01)v(10↔00) |
| VREF01H | {(11↔01)v(10↔00)}//{01v(11↔00)} |
| 01 | (01↔01)v(11↔00) |
| VREF01L | {01v(11↔00)}//(01↔00) |
| 1/6VDD | 01↔00 |
| VREF00H | (01↔00)//00 |
| 00 | 00↔00 |

FIG. 17

| OA | OB | OC | ED2<br>(=ED1) | OD2<br>(=OD1) |
|----|----|----|---------------|---------------|
| H  | H  | H  | 1             | 0             |
| L  | H  | H  | 1             | 1             |
| L  | L  | H  | 0             | 1             |
| L  | L  | L  | 0             | 0             |

US 6,930,513 B2

SIMULTANEOUS BI-DIRECTIONAL SIGNAL TRANSMISSION SYSTEM AND SEMICONDUCTOR DEVICE THEREFOR

BACKGROUND OF THE INVENTION

This application claims the priority of Korean Patent Application No. 2002-81736 filed on Dec. 20, 2002, in the Korean Intellectual Property Office, the disclosure of which is incorporated herein in its entirety by reference.

1. Field of the Invention

The present invention relates to a semiconductor device, and more particularly, to a simultaneous bi-directional signal transmission system which simultaneously and bi-directionally transmits and receives 4-level signals at high speed, and a simultaneous bi-directional input/output circuit therefor.

2. Description of the Related Art

As the operating speed of a computer system increases, data must be input and output between semiconductor devices at ever-higher speeds. To obtain a higher data rate between semiconductor devices, the semiconductor devices should be connected in point-to-point fashion, i.e., in series, to transmit and receive data. This is normally referred to as "serial communication."

However, serial communication suffers from impedance mismatching between semiconductor devices, interference between transmission signals, distance of serial communication, and data skew.

SUMMARY OF THE INVENTION

The present invention provides a simultaneous bi-directional signal transmission system which can simultaneously transmit and receive 4-level signals in both transmit and receive directions while mitigating the limitations of the conventional approaches, including impedance mismatching between semiconductor devices, interference between transmission signals, distance of serial communication, and data skew.

The present invention also provides a simultaneous bi-directional input/output circuit which can be used in a simultaneous bi-directional signal transmission system.

According to a first aspect of the present invention, there is provided a simultaneous bi-directional signal transmission system which comprises a first semiconductor device, a second semiconductor device, and one or more transmission lines which connect the first and second semiconductor devices. The first semiconductor device includes a first output MUX which receives first binary data and converts the first binary data into a first signal having one of at least four levels and a first transmitter which is connected to the first output MUX and outputs the first signal via the transmission line to the second semiconductor device. The second semiconductor device includes a second output MUX which receives second binary data and converts the second binary data into a second signal having one of at least four levels and a second transmitter which is connected to the second output MUX and outputs the second signal via the transmission line to the first semiconductor device.

The first semiconductor device further includes a first receiver which compares one or more reference voltages selected by the first signal with a third signal input via the transmission line and outputs the comparison result, and a first input encoder which detects the second binary data based on the comparison result output from the first receiver.

The second semiconductor device includes a second receiver which compares one or more reference voltages selected by the second signal with the third signal input via the transmission line and outputs the comparison result, and a second input encoder which detects the first binary data based on the comparison result output from the second receiver.

The third signal is determined by the output first signal of the first transmitter and the output second signal of the second transmitter. The third signal is a signal which has, for example, one of 7 levels.

The reference voltage has a level between one of seven levels and one of four levels.

The first transmitter includes an output driver and an impedance calibration circuit. The impedance calibration circuit performs calibration when the first semiconductor device is initialized, and outputs an N-bit control signal for matching the impedance of the output driver connected to the transmission line with the impedance of the transmission line. The output driver calibrates its own impedance in response to the N-bit control signal and sends the first signal over the transmission line in response to the first binary data and a logic value corresponding to the first signal.

The second transmitter includes an output driver and an impedance circuit. The impedance calibration circuit performs calibration when the second semiconductor device is initialized, and outputs an N-bit control signal for matching the impedance of the output driver connected to the transmission line with the impedance of the transmission line. The output driver calibrates its own impedance in response to the N-bit control signal, and sends the second signal over the transmission in response to the second binary data and a logic value corresponding to the second signal.

The first receiver includes a reference voltage generator which generates a plurality of reference voltages, and a comparison circuit which selects a reference voltage from the plurality of reference voltages in response to the first signal, compares the selected reference voltage with the third signal, and outputs the comparison result.

The second receiver includes a reference voltage generator which generates a plurality of reference voltages, and a comparison circuit which selects a reference voltage from the plurality of reference voltages in response to the second signal, compares the selected reference voltage with the third signal, and outputs the comparison result.

According to a second aspect of the present invention, there is provided a semiconductor device comprising a pad; an output MUX which receives first binary data, converts the first binary data into an output signal having one of at least four levels; a transmitter which is connected between the output MUX and the pad and sends the output signal over a transmission line, connected to the pad, to a signal transmission circuit; a receiver which compares one or more reference voltages selected by the output signal with a signal received through the pad and outputs the comparison result; and an input encoder which detects second binary data output by the signal transmission circuit based on the comparison result of the receiver.

The transmitter includes an output driver and an impedance calibration circuit. The impedance calibration circuit performs calibration when the semiconductor device is initialized, and outputs an N-bit control signal for matching the impedance of the output driver connected to the transmission line to the impedance of the transmission line. The output driver calibrates its own impedance in response to the N-bit control signal, and sends the output signal over the transmission line in response to the first binary data and a logic value corresponding to the first signal.

BRIEF DESCRIPTION OF THE DRAWINGS

The above features and advantages of the present invention will become more apparent by describing in detail exemplary embodiments thereof with reference to the attached drawings in which:

FIG. 2 illustrates levels of output signals of the output MUX of the system of FIG. 1;

FIG. 3 illustrates data levels of the transmission line of the system of FIG. 1;

FIG. 17 illustrates output signals of the input encoder of the system of FIG. 1.

DETAILED DESCRIPTION OF THE PREFERRED EMBODIMENTS

Figure 1:
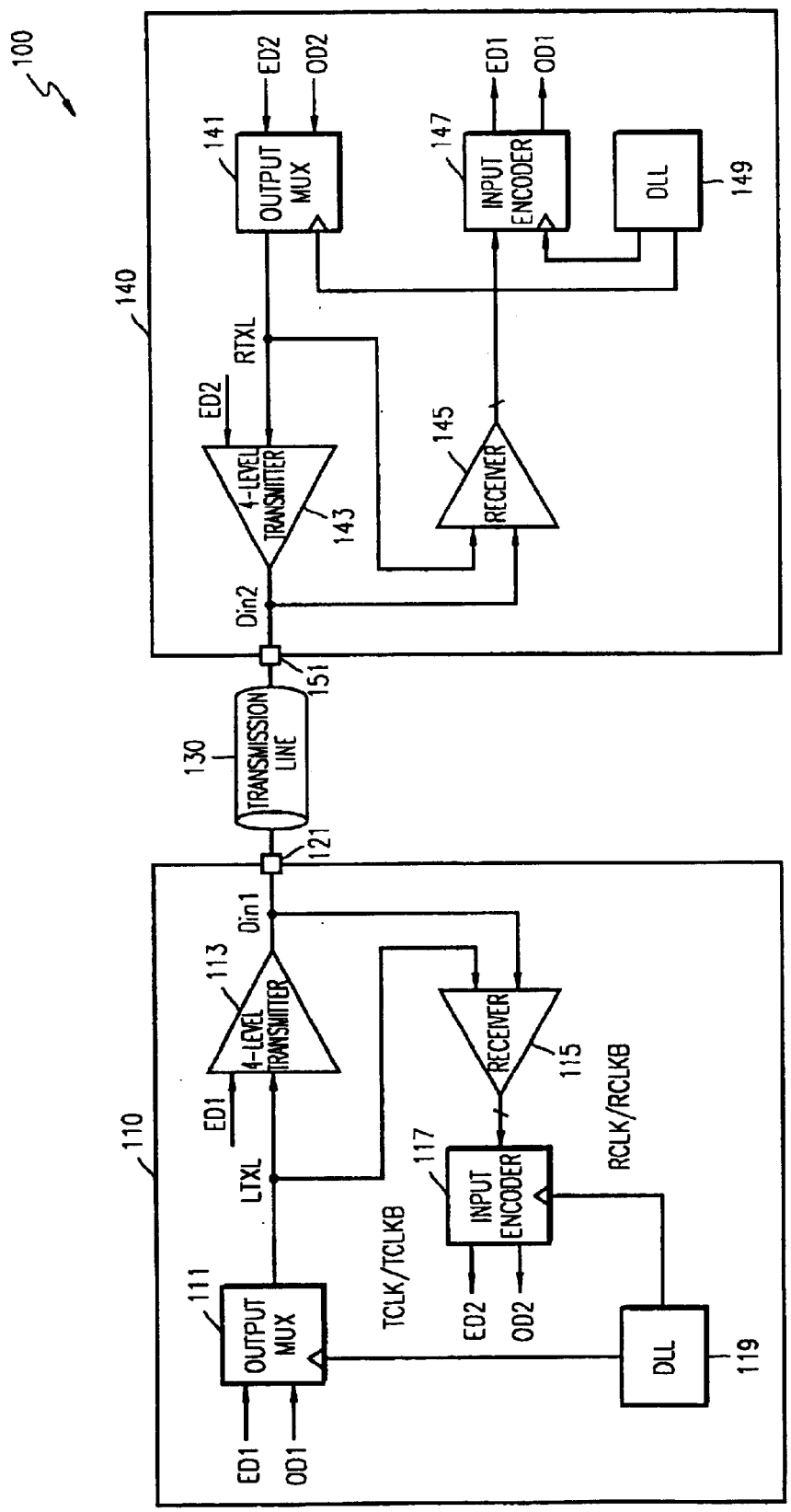
FIG. 1 is a schematic block diagram of a 4-level simultaneous bi-directional system according to a preferred embodiment of the present invention.

The present invention will now be described more fully with reference to the accompanying drawings, in which preferred embodiments of the invention are shown. The same reference numerals in different drawings represent the same element.

FIG. 1 is a schematic block diagram of a 4-level simultaneous bi-directional system according to a preferred embodiment of the present invention. Referring to FIG. 1, the 4-level simultaneous bi-directional system 100 comprises a first semiconductor device 110, a transmission line 130, and a second semiconductor device 140.

The first semiconductor device 110 simultaneously transmits data to and receives data from the second semiconductor device 140 via the transmission line 130. While the semiconductor devices 110 and 140 illustrated in FIG. 1 include respective single transmitter/receiver sets 113 and 115, and 143 and 145, the number of the transmitter/receiver sets of the 4-level simultaneous bi-directional system 100 according to the present invention is not thus limited.

The first semiconductor device 110 includes an output MUX 111, a 4-level transmitter 113, a receiver 115, an input encoder 117, a delay locked loop (DLL) 119, a pad 121, and a memory device (not shown) for storing data.

The output MUX 111 receives even-numbered data ED1 and odd-numbered data OD1 which are output from the memory device, in response to transmission clock signals TCLK and TCLKB, encodes the data ED1 and OD1, and outputs the coding result LTXL. In this manner, the output MUX 111 also functions as a converter which converts digital signals ED1 and OD1 into an analog signal LTXL.

The DLL 119 generates transmission clock signals TCLK and TCLKB to synchronize the phase of each of data ED1 and OD1 output from the memory device with the phase of data output from the first semiconductor device 110 to the transmission line 130. The transmission clock signals TCLK and TCLKB are differential signals.

Table 1 shows the output signals LTXL and RTXL of the output MUXes 111 and 141.

TABLE 1

| ED1(=ED2=READ<0>) | OD1(=OD2) | LTXL(=RTXL) |
| --- | --- | --- |
| 0 | 0 | En00 |
| 0 | 1 | En01 |
| 1 | 1 | En11 |
| 1 | 0 | En10 |

The 4-level transmitter 113 outputs the output signal LTXL output from the MUX 111 via the pad 121 to the transmission line 130 in response to the even-numbered data ED1.

The receiver 115 receives one or more reference voltages selected by the output signal LTXL of the output MUX 111 and a signal Din1 input via the pad 121 from the transmission line 130, compares them, and outputs the comparison result to the input encoder 117.

The input encoder 117 receives the output signal of the receiver 115 and encodes data ED2 and OD2 output from the second semiconductor device 140 and outputs the encoded data ED2 and OD2 to the memory device in response to the clock signals RCLK and RCLKB.

Clock signals RCLK and RCLKB, which are differential signals, are used to synchronize the phase of the output signal of the receiver 115 with the phase of the data written into the memory device.

The structure and operation of the second semiconductor device 140 are the same as those of the first semiconductor device 110. That is, the second semiconductor device 140 includes an output MUX 141, a 4-level transmitter 143, a receiver 145, an input encoder 147, a delay locked loop (DLL) 149, a pad 151, and a memory device (not shown) for storing data ED1, ED2, OD1, and OD2.

As shown in Table 1, the first semiconductor device 110 outputs the signal LTXL via the transmission line 130 and the pads 121 and 151 to the second semiconductor device 140. The signal LTXL has one of four levels En00, En01, En1, and En10, which correspond to the logic states of the data ED1 and OD1 output from the memory device. At the same time, the second semiconductor device 140 outputs the signal RTXL via the transmission line 130 and the pads 121 and 151 to the first semiconductor device 110. The signal RTXL has one of four levels En00, En01, En11, and En10, which correspond to the logic states of the data ED2 and OD2 output from the memory device. Then, the second semiconductor device 140 compares a reference voltage, which is selected from the plurality of reference voltages depending on a voltage state of the output signal RTXL of the output MUX 141, with a received signal Din2, and detects the data ED1 or OD1 output from the memory device of the first semiconductor device 110 based on the comparison result. At the same time, the first semiconductor device 110 compares a reference voltage, which is selected from the plurality of reference voltages depending on a voltage state of the output signal LTXL of the output MUX 111, with the received signal Din1, and detects the data ED2 and OD2 output from the memory device of the second semiconductor device 140 based on the comparison result.

FIG. 2 illustrates the levels of the output signals of the output MUXes 111 and 141. Referring to FIG. 1 and Table 1, each of the output MUX 111 and 141 outputs the signal LTXL or RTXL having one of the four levels in response to the input data ED1 and OD1 or ED2 and OD2. The level En00 has a level of a ground voltage VSS, En10 has a level of a power supply voltage VDD, En01 has a level which is ⅓ the level of the power supply voltage VDD, and En11 has a level which is ⅔ the level of the power supply voltage VDD.

FIG. 3 illustrates data levels of the transmission line of FIG. 1. Referring to FIGS. 1 through 3, a signal level of the transmission line 130 has one of seven levels.

For instance, when the level of the output signal LTXL of the output MUX 111 of the first semiconductor device 110 is En10 and the level of the output signal RTXL of the output MUX 141 of the second semiconductor device 140 is En10, the signal level of the transmission line 130 has a level of En10 (=10, or VDD).

When the output signal LTXL is En11 and the output signal RTXL is En10, the signal of the transmission line has a level which is half way between En11 and En10, i.e., a level of ⅚ of VDD. That is, the signal level of the transmission line 130 has a level equal to half the sum of the output signal LTXL of the output MUX 111 of the first semiconductor device 110 and the output signal RTXL of the output MUX 141 of the second semiconductor device 140.

Figure 4:
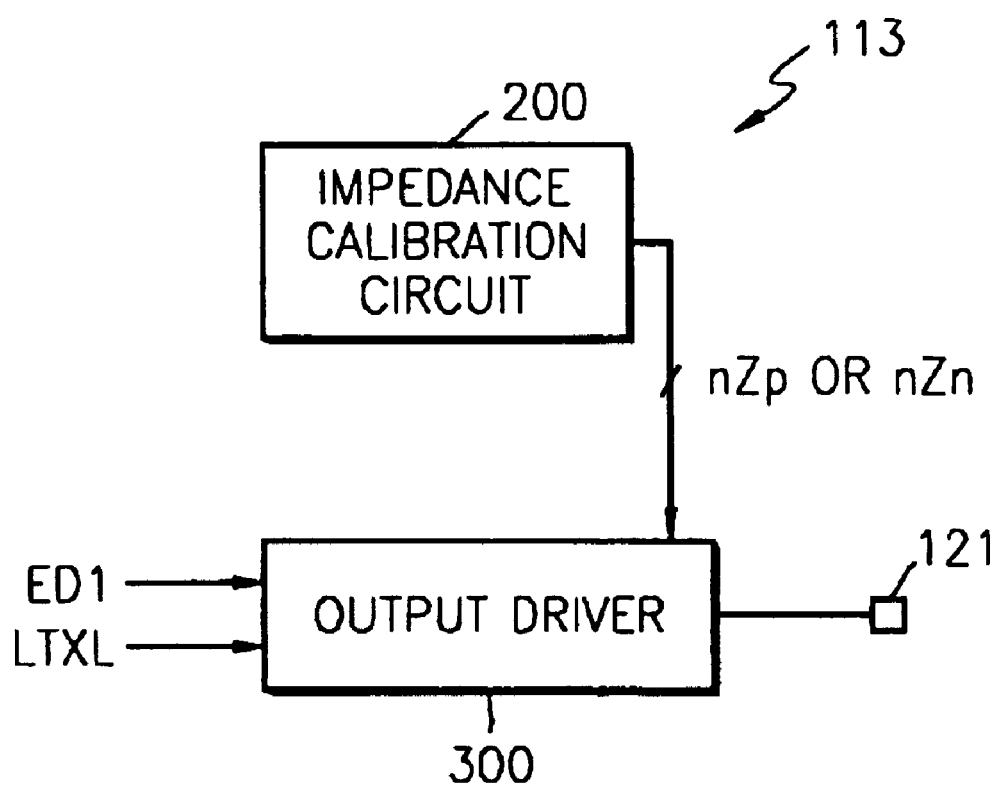
FIG. 4 is a block diagram of the 4-level transmitter of the system of FIG. 1.

FIG. 4 is a block diagram of the 4-level transmitter of FIG. 1. Referring to FIG. 4, the 4-level transmitter 113 includes an impedance calibration circuit 200 and an output driver 300.

To remove interference between transmission signals, an external value of impedance connected to each of the pads 121 and 151 of each of the semiconductor devices 110 and 140 and Thevenin's impedance seen at each of the pads 121 and 151 should be identical or maintained to be a predetermined value.

In other words, the impedance of the output driver 300 of the first semiconductor device 110 seen at the pad 121 should be matched with the impedance of the transmission line 130. Likewise, the impedance of an output driver of the second semiconductor device 140 seen at the pad 151 should be matched with the impedance of the transmission line 130.

Thus, when each of the semiconductor devices 110 and 140 is initialized, the impedance of the output driver seen from each of the pads 121 and 151 should be automatically calibrated to a predetermined value, e.g., the impedance of the transmission line 130.

Accordingly, the impedance calibration circuit 200 performs calibration only during a particular case such as power-up or reset.

The output driver 300 calibrates its impedance in response to an N-bit (N=5) control signal (nZp or nZn, where n is a rational number) output from the impedance calibration circuit 200, and outputs the signal LTXL through the pad 121 in response to the even-numbered data ED1 and a logic value corresponding to the signal LTXL output from the output MUX 111 of FIG. 1.

Figure 5:
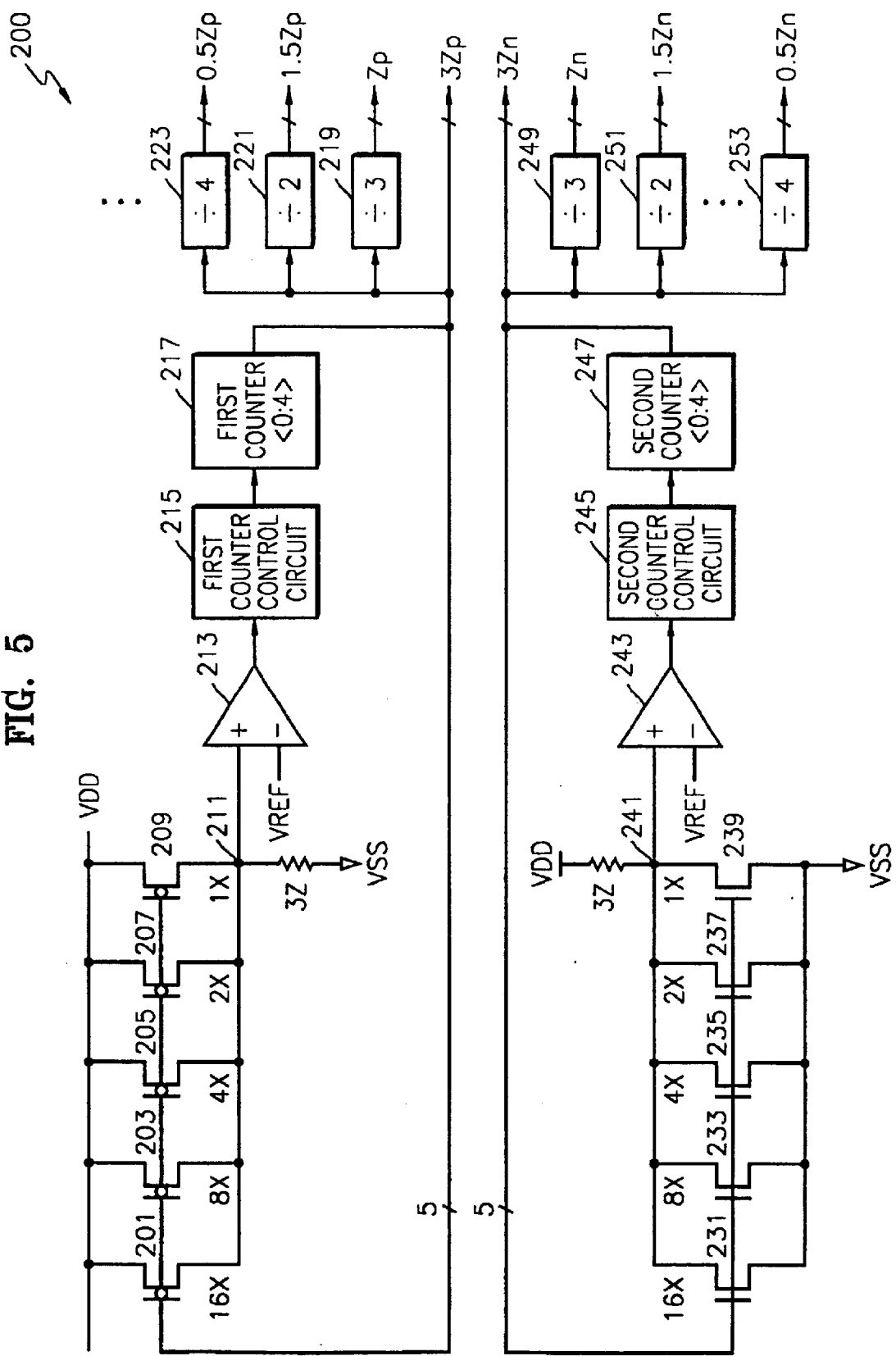
FIG. 5 is a circuit diagram of the impedance calibration circuit of FIG. 4.

FIG. 5 is a circuit diagram of the impedance calibration circuit of FIG. 4. Referring to FIG. 5, the impedance calibration circuit 200 includes an impedance 3Z, a plurality of PMOS transistors 201, 203, 205, 207, and 209, a first comparison circuit 213, a first counter control circuit 215, and a first counter 217.

Each of the PMOS transistors 201, 203, 205, 207, and 209 is connected between a power supply voltage VDD and a node 211, and the gates of each of the PMOS transistors 201, 203, 205, 207, and 209 are controlled in response to respective bits of an output signal 3Zp of the first counter 217. The output signal 3Zp of the first counter 217 includes 5 bits.

Preferably, each of the PMOS transistors 201, 203, 205, 207, and 209 has a different channel width (e.g., 16×, 8×, 4×, 2×, or 1×) or β ratio.

The impedance 3Z is connected between the node 211 and the ground voltage VSS. The first comparison circuit 213 compares a reference voltage VREF input to the (−) input terminal with a voltage of the node 211 input to the (+) input terminal, and outputs the comparison result to the first counter control circuit 215. The reference voltage VREF level is preferably half of the power supply voltage VDD level.

The first counter control circuit 215 controls the operation of the first counter 217 in response to the output signal of the first comparison circuit 213. The first counter 217 outputs the 5-bit output signal 3Zp to the output driver 300.

The gate of each of the PMOS transistors 201, 203, 205, 207, and 209 is turned on/off in response to respective bits of the output signal 3Zp of the first counter 217. If the impedance 3Z is equal to the value of impedance of the PMOS transistors 201, 203, 205, 207, and 209, which are turned on/turned off in response to respective bits of the output signal 3Zp of the first counter 217, the voltage of the node 211 becomes equal to the reference voltage VREF. Here, the first counter control circuit 215 controls to hold a count value of the first counter 217 in response to the output signal of the first comparison circuit 213.

For example, when the first counter 217 starts counting up from <00000> and then reaches <10010>, if each of the PMOS transistors 201 and 207 is turned on in response to the count value <10010> and the value of the turn-on resistance of the PMOS transistors 201 and 207 becomes 3Z, the voltage of the node 211 becomes equal to the reference voltage VREF.

When the voltage of the node 211 is equal to the reference voltage VREF, the first counter control circuit 215 outputs a control signal for holding the count value <10010> of the first counter 217 to the first counter 217. Also, when the count value 3Zp of the first counter 217 increases, the voltage of the node 211 gradually decreases from the level of the power supply voltage VDD to the level of the reference voltage VREF. The first counter 217 is reset in response to a predetermined reset signal (not shown).

The output impedance control circuit 200 further includes dividers 219, 221, and 223 for generating output signals Zp, 1.5Zp, and 0.5Zp, respectively.

For example, when 3Zp is <10010>, Zp is <00110>, 1.5Zp is <01100>, and 0.5Zp is <01001>. It will be apparent to one skilled in the art that the impedance calibration circuit 200 can be embodied by a number of different methods. In the present example, a circuit that generates Zp, 1.5Zp, or 0.5Zp by using 3Zp is embodied; however, the present invention is not limited to this embodiment.

The impedance calibration circuit 200 further includes another impedance 3Z, a plurality of NMOS transistors 231, 233, 235, 237, and 239, a second comparison circuit 243, a second counter control circuit 245, and a second counter 247. Each of the NMOS transistors 231, 233, 235, 237, and 239 is controlled by an output signal 3Zn of the second counter 247 independently of the PMOS transistors 201, 203, 205, 207, and 209.

The impedance 3Z is connected between the power supply voltage VDD and a node 241, and each of the NMOS transistors 231, 233, 235, 237, and 239 is connected between the node 241 and the ground voltage VSS. The gates of each of the NMOS transistors 231, 233, 235, 237, and 239 are controlled in response to respective bits of the 5-bit output signal 3Zn output from the second counter 247.

The second comparison circuit 243 receives a voltage of the node 241 through its (+) input terminal and a reference voltage VREF through its (−) input terminal, compares them, and outputs the comparison result via its output terminal to the second counter control circuit 245. When the output signal 3Zn of the second counter 247 increases, the voltage of the node 241 gradually decreases from the level of the power supply voltage VDD to the level of the reference voltage VREF.

When the voltage of the node 241 is equal to the reference voltage VREF, the second counter control circuit 245 controls to hold the output signal 3Zn of the second counter 247 in response to the output signal of the second comparison circuit 243.

The output impedance control circuit 200 further includes dividers 249, 251, and 253 that generate Zn, 1.5Zn, and 0.5Zn, respectively.

Figure 6:
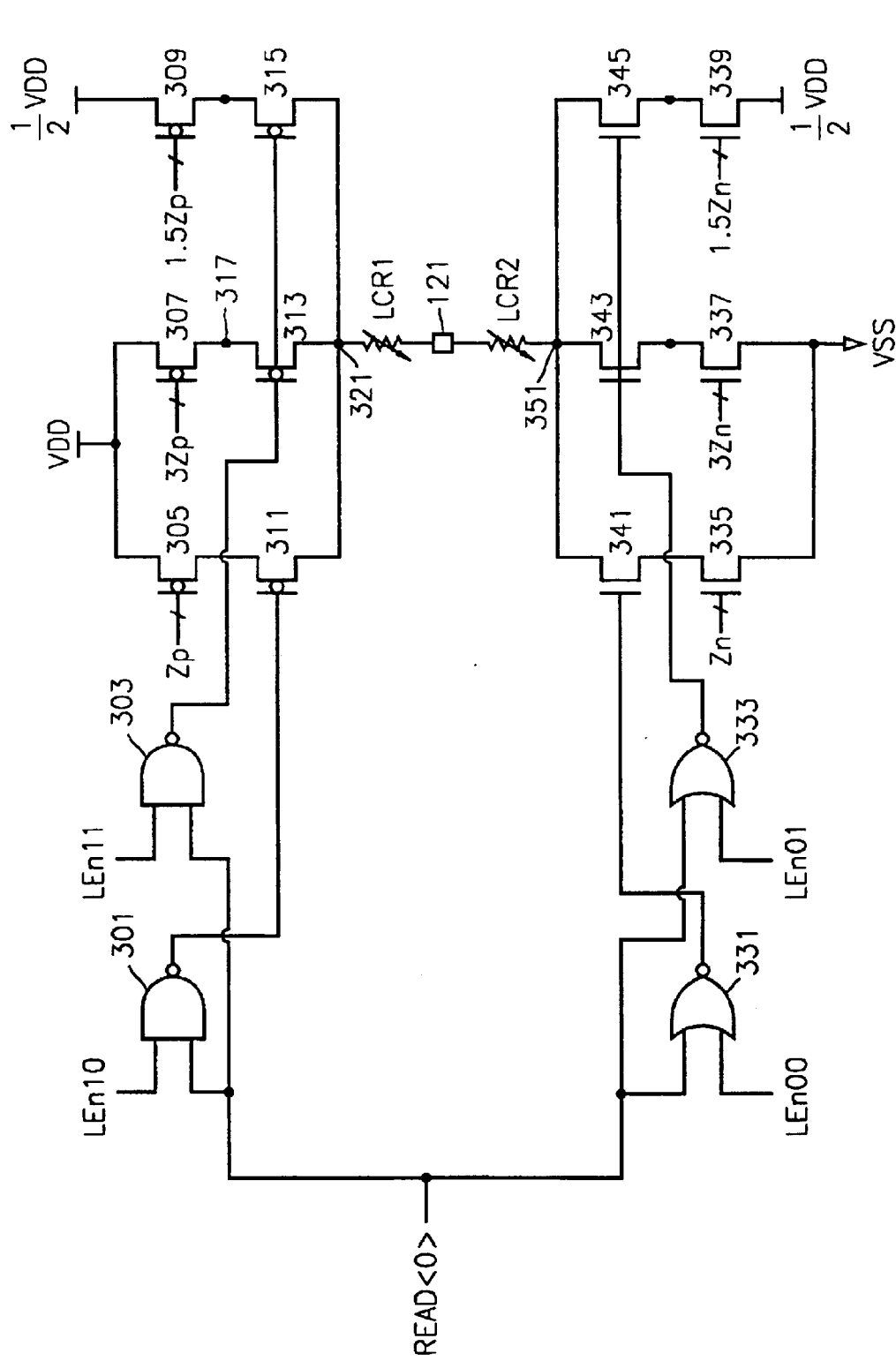
FIG. 6 is a circuit diagram of an output driver of FIG. 4.

FIG. 6 is a circuit diagram of the output driver of FIG. 4. Referring to FIG. 6, the output driver 300 includes a plurality of logic circuits 301, 303, 331, and 333, a plurality of transistor groups 305, 307, 309, 335, 337, and 339, a plurality of transistors 311, 313, 315, 341, 343, and 345, and linear control resistors LCR1 and LCR2.

Figure 7:
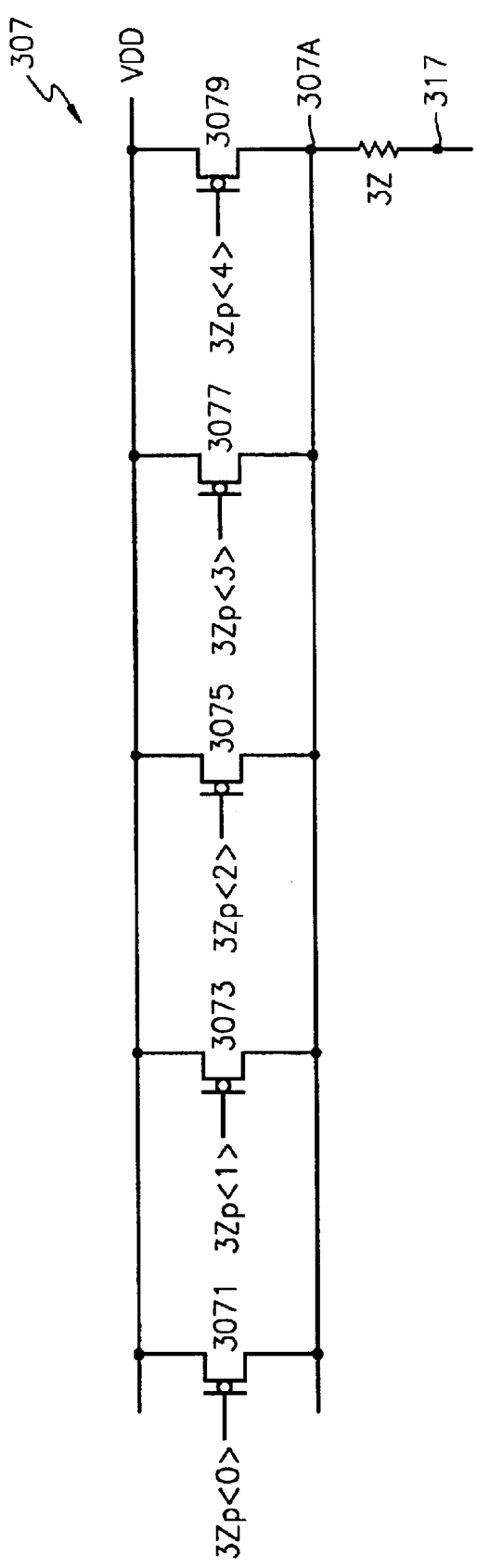
FIG. 7 is a circuit diagram of a transistor group of FIG. 6.

FIG. 7 is a circuit diagram of the transistor group of FIG. 6. FIG. 7 illustrates only a single transistor group 307 for brevity. Since the other transistor groups 305, 309, 335, 331, and 339 are essentially the same as the transistor group 307 of FIG. 7, a detailed description of each of them will be omitted here.

The transistor group 307 includes a plurality of transistors 3071, 3073, 3075, 3077, and 3079, each of which is connected between a power supply voltage VDD and a node 307A, and an impedance 3Z that is connected between the node 307A and another node 317.

The gates of each of the transistors 3071, 3073, 3075, 3077, and 3079 of the transistor group 307 are turned on/turned off in response to the respective bits (3Zp<0> through 3Zp<4>) of the first counter 217 of FIG. 5.

Returning to FIG. 6, each transistor in the transistor group 305 is turned on/turned off in response to a corresponding bit of an output signal Zp output from the divider 219 of FIG. 5, and each transistor in the transistor group 309 is turned on/turned off in response to a corresponding bit of an output signal 1.5Zp of the divider 221 of FIG. 5.

Also, each transistor in the transistor group 337 is turned on/turned off in response to a corresponding bit of an output signal 3Zn of the second counter 247 of FIG. 5, each transistor in the transistor group 335 is turned on/turned off in response to a corresponding bit of an output signal Zn of the divider 249 of FIG. 5, and each transistor in the transistor group 339 is turned on/turned off in response to a corresponding bit of an output signal 1.5Zn of the divider 251 of FIG. 5.

The PMOS transistor group 305 is connected between a first power supply voltage VDD and a node 321 via the PMOS transistor 311, the PMOS transistor group 307 is connected between the first power supply voltage VDD and the node 321 via the PMOS transistor 313, and the PMOS transistor group 304 is connected between a second power supply voltage 1/2VDD and the node 321 via the PMOS transistor 315.

The gate of the PMOS transistor 311 is connected to the output terminal of the first logic circuit 301, and the gates of each of the PMOS transistors 313 and 315 are connected to the output terminal of the second logic circuit 303.

The first logic circuit 301 performs a NAND operation on LEn10 and READ<0>, and the second logic circuit 303 performs a NAND operation on LEn10 and READ<0>.

The first linear control resistor LCR1 is connected between the node 321 and the pad 121, and the second linear control resistor LCR2 is connected between the pad 121 and the node 351.

The NMOS transistor group 335 is connected between a ground voltage VSS and the node 351 via the NMOS transistor 341, the NMOS transistor group 337 is connected between the ground voltage VSS and the node 351 via the NMOS transistor 343, and the NMOS transistor group 339 is connected between the second ground voltage 1/2VDD and the node 351 via the NMOS transistor 345.

The gate of the NMOS transistor 341 is connected to the output terminal of the third logic circuit 331, and the gates of each of the NMOS transistors 343 and 345 are connected to the output terminal of the fourth logic circuit 333.

The third logic circuit 331 performs a NOR operation on LEn00 and READ<0>, and the fourth logic circuit 333 performs a NOR operation on LEn01 and READ<0>.

Table 2 shows logic values corresponding to the output signals LTXL and RTXL of each of the output MUXes 111 and 141 of FIG. 1.

TABLE 2

| LTXL(=RTXL) | LEn10 | LEn11 | LEn01 | LEn00 |
|---|---|---|---|---|
| En10 | High | Low | Low | Low |
| En11 | Low | High | Low | Low |
| En01 | Low | Low | High | Low |
| En00 | Low | Low | Low | High |

For instance, the impedance calibration circuit 200 outputs control signals nZp and nZn (n is a rational number such as 0.5,1, 1.5, 2, or 3), each of which includes 5 bits, to the corresponding MOS transistor group 305, 307, 309, 335, 337, or 339. Accordingly, each MOS transistor in each MOS transistor group 305, 307, 309, 335, 337, and 339 is turned on/turned off in response to corresponding bits of the control signals nZp and nZn.

Referring to Tables 1 and 2 and FIG. 6, when the output signal LTXL of the output MUX 111 is En10, the logic value LEn10 of En10 is high and a value of READ<0> is 0. Accordingly, the first logic circuit 301 outputs a logic high value to the gate of the PMOS transistor 311, and the second logic circuit 303 outputs a logic high value to the gates of the PMOS transistors 313 and 315. Also, the third logic circuit 331 and the fourth logic circuit 333 output a logic high value to the gates of the corresponding NMOS transistors 341, 343, and 345.

Accordingly, the output driver 300 outputs a voltage having the level of the power supply voltage VDD via the pad 121. That is, the output driver 300 preferably outputs the voltage corresponding to En10.

When the output signal LTXL of the output MUX 111 is En11, the logic value LEn11 of En11 is high and the value of READ<0> is 1. Thus, as each of the PMOS transistors 313 and 315 is turned on, a voltage of the pad 121 is determined by the first power supply voltage VDD and the second power supply voltage 1/2VDD. Accordingly, the output driver 300 according to the present invention can output En11 by appropriately controlling the turn-on resistance of each PMOS transistor of each of the PMOS transistor groups 307 and 309 and the turn-on resistance of each of the PMOS transistors 313 and 315.

When the output signal LTXL of the output MUX 111 is En00, the logic value LEn00 of En00 is high and the value of READ<0> is 0. Thus, as the NMOS transistor 341 is turned on, the voltage of the pad 121 is determined by the ground voltage VSS. In this case, the output driver 300 outputs En00.

When the output signal LTXL of the output MUX 111 is En01, the logic value LEn01 of En01 is high and the value of READ<0> is 0. Thus, the NMOS transistor 341 is turned on, the voltage of the pad 121 is determined by the ground voltage VSS and the second power supply voltage 1/2VDD. Accordingly, the output driver 300 according to the present invention can output En01 by appropriately controlling the turn-on resistance of each NMOS transistor of each of the NMOS transistor groups 337 and 339 and the turn-on resistance of each of the NMOS transistors 343 and 345.

Accordingly, the output driver 300 outputs a voltage corresponding to En10, En11, En00, or En01 via the pad 121.

Figure 8:
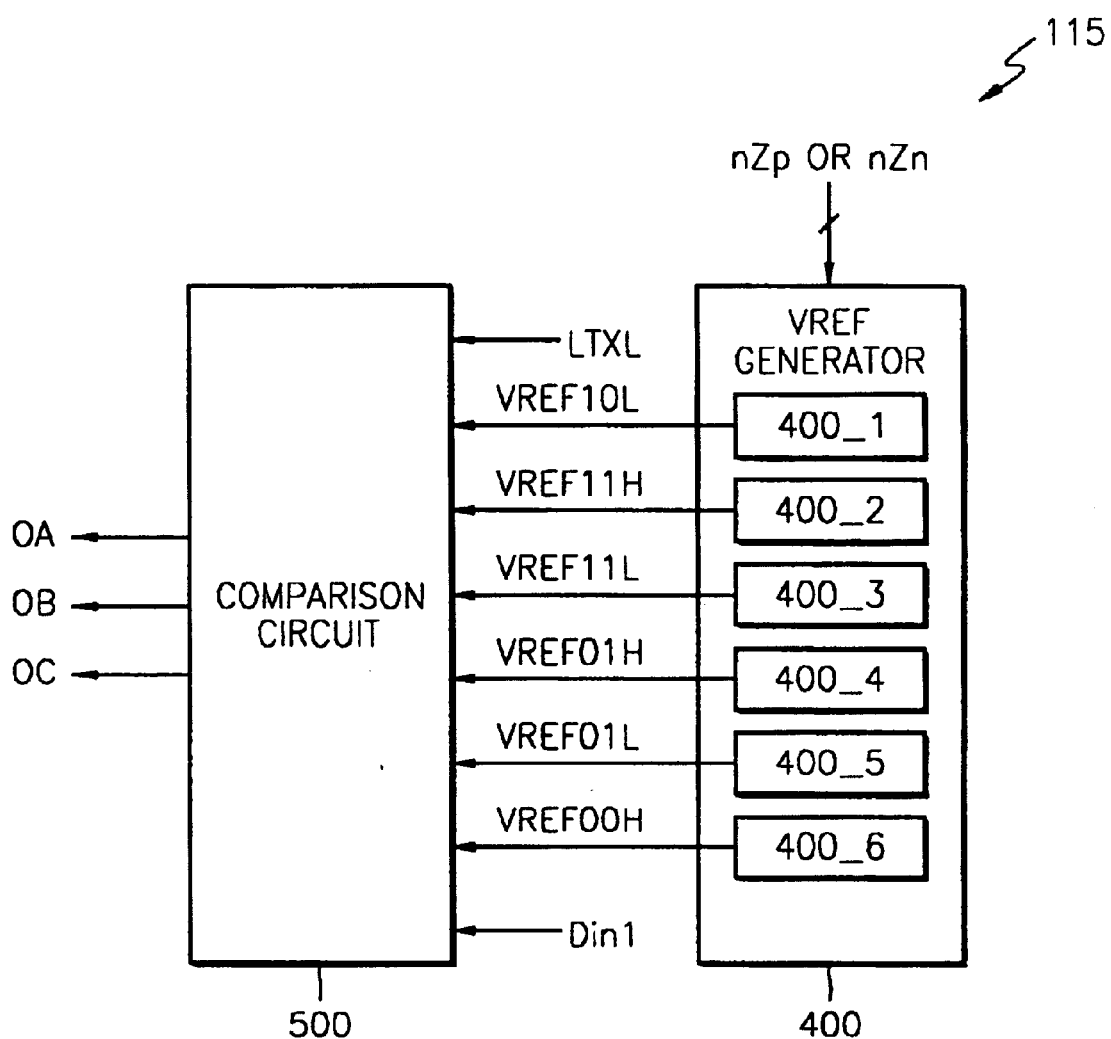
FIG. 8 is a block diagram of a receiver of a 4-level simultaneous bi-directional input/output circuit.

FIG. 8 is a block diagram of the receiver of the 4-level simultaneous bi-directional input/output circuit of FIG. 1. Referring to FIG. 8, the receiver 115 includes a reference voltage generating circuit 400 and a comparison circuit 500. The reference voltage generating circuit 400 includes reference voltage generators 400_1 through 400_6 to generate first through sixth reference voltages VREF10L, VREF11H, VREF11L, VREF01H, VREF01L, and VREF00H in response to the output signals nZp and nZn of the impedance calibration circuit 200 of FIG. 4.

The comparison circuit 500 selects one or more reference voltages among the first through sixth reference voltages VREF10L, VREF11H, VREF11L, VREF01H, VREF01L, and VREF00H in response to the output signal LTXL of the output MUX 111, compares the selected reference voltage with the input data Din1, and outputs the comparison result OA, OB, and OC to the input encoder 117.

Figure 9:
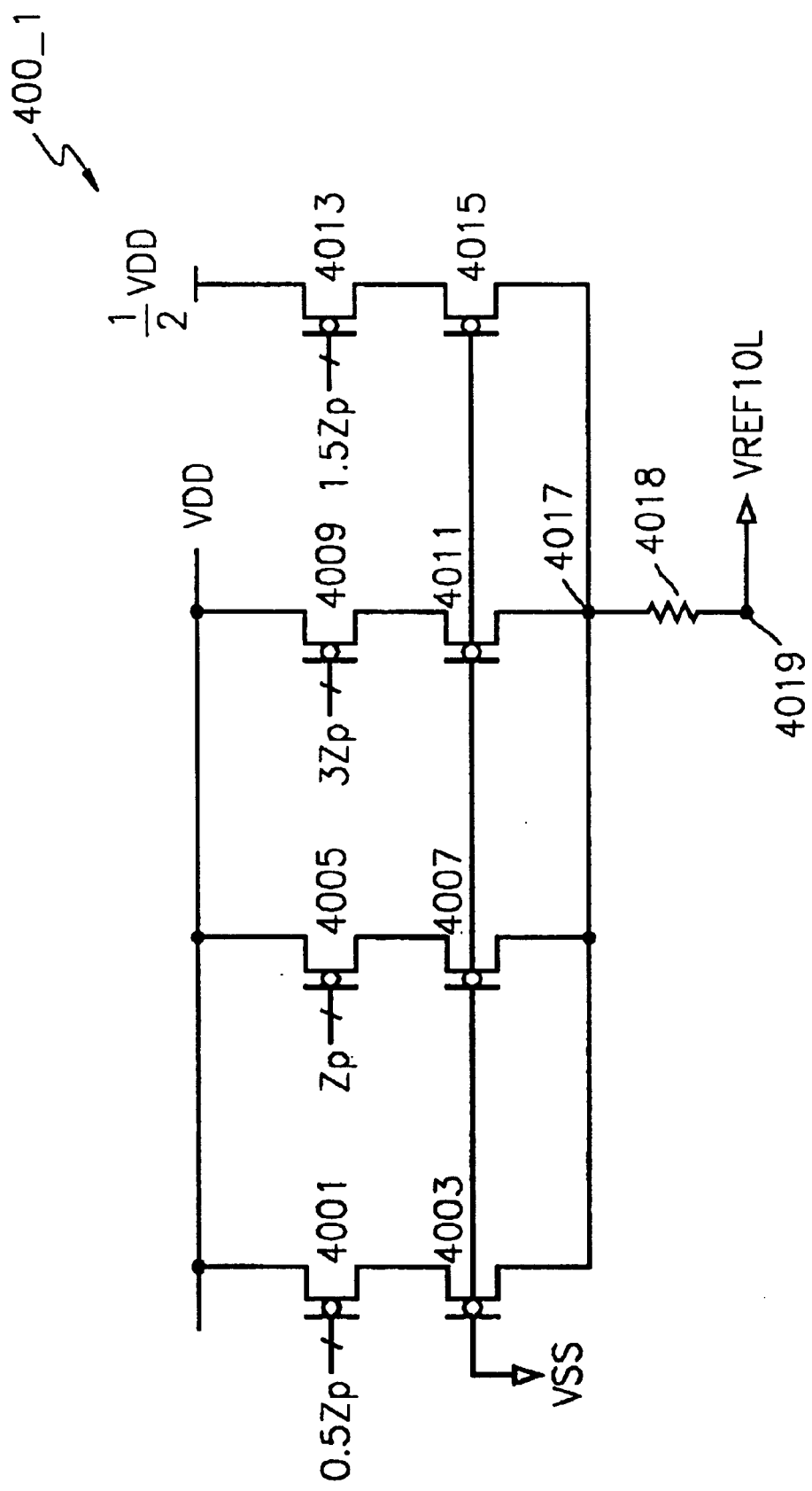
FIG. 9 is a circuit diagram of a first reference generating circuit.

FIG. 9 is a circuit diagram of a first reference generating circuit. Referring to FIG. 9, the first reference voltage generating circuit 400_1 includes a plurality of PMOS transistor groups 4001, 4005, 4009, and 4013, a plurality of PMOS transistors 4003, 4007, 4011, and 4015, and an impedance 4018.

Referring to FIGS. 5, 7, and 9, the control signals 0.5Zp, Zp, 3Zp, and 1.5Zp, which are output from the impedance calibration circuit 200, are input to the gates of the corresponding PMOS transistor groups 4001, 4005, 4009, and 4013, respectively.

The PMOS transistors in the PMOS transistor groups 4001, 4005, and 4009 are connected between the first power supply voltage VDD and a node 4017 via the PMOS transistors 4003, 4007, and 4011, respectively. Each PMOS transistor in the PMOS transistor group 4013 is connected between the second power supply voltage 1/2VDD and the node 4017 via the PMOS transistor 4015.

The gates of the PMOS transistors 4003, 4007, 4011, and 4015 are each connected to the ground voltage VSS. The impedance 4018 is connected between the node 4017 and a node 4019, and the voltage of the node 4019 is the first reference voltage VREF10L.

Figure 15:
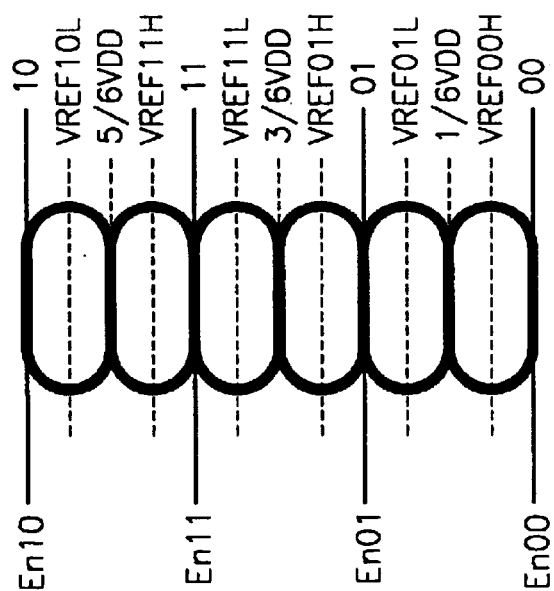
FIG. 15 illustrates levels and conditions of first through sixth reference voltages.

For instance, when the PMOS transistor group 4001 responds to 0.5Zp and has an impedance of 0.5Z, the PMOS transistor group 4005 responds to Zp and has an impedance of Z, the PMOS transistor group 4009 responds to 3Zp and has an impedance of 3Z, and the PMOS transistor group 4013 responds to 1.5Zp and has an impedance of 1.5Z, the value of the impedance 4018 is preferably 4Z. FIG. 15 illustrates levels of the first reference voltage VREF10L.

Figure 10:
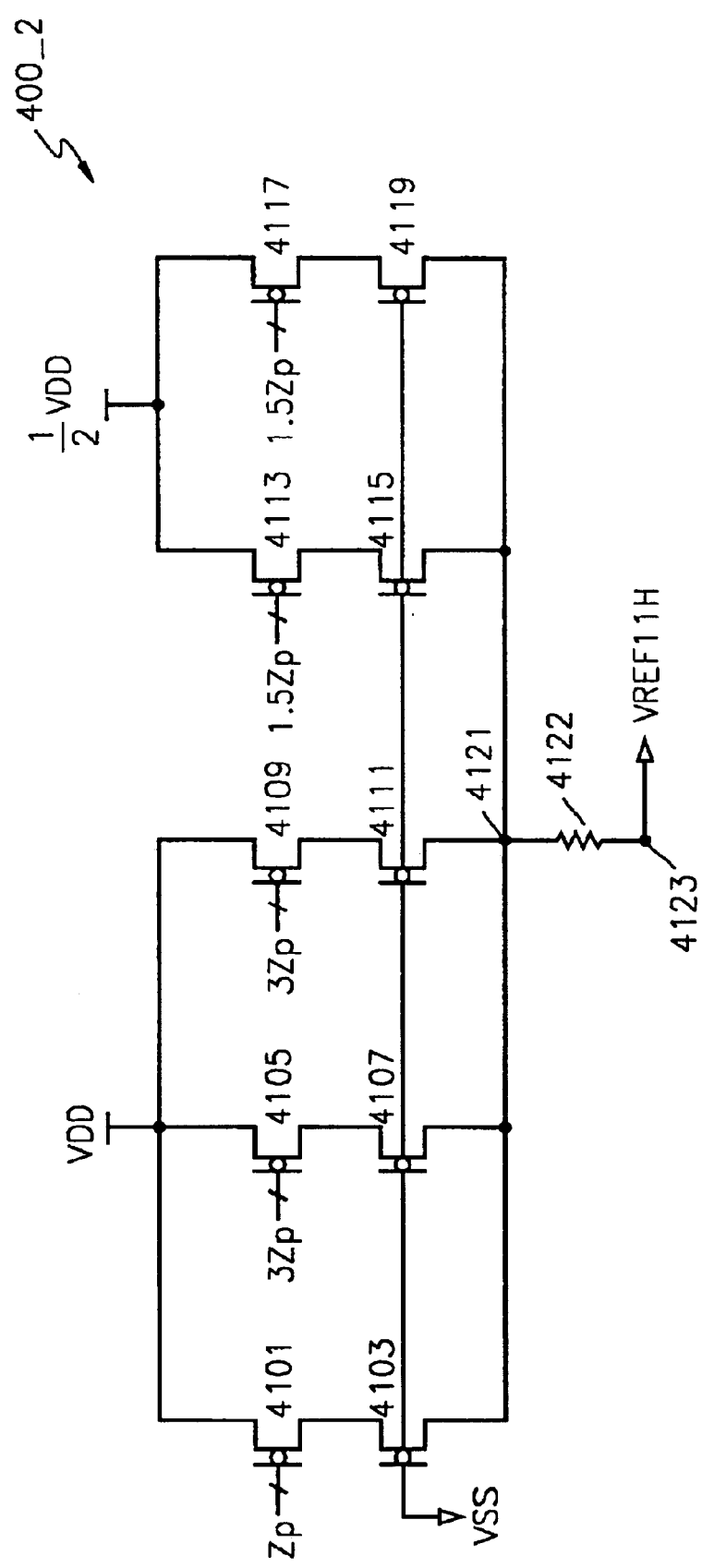
FIG. 10 is a circuit diagram of a second reference generating circuit.

FIG. 10 is a circuit diagram of a second reference voltage generating circuit. Referring to FIG. 10, the second reference voltage generating circuit 400_2 includes a plurality of PMOS transistor groups 4101, 4105, 4109, 4113, and 4117, a plurality of PMOS transistors 4103, 4107, 4111, 4115, and 4119, and an impedance 4122.

Referring to FIGS. 5, 7, and 10, the control signals Zp, 3Zp, and 1.5Zp, which are output from the impedance calibration circuit 200, are input to the gates of the PMOS transistor groups 4101, 4105, 4109, 4113, and 4117, respectively.

The PMOS transistors in each of the PMOS transistor groups 4101, 4105, and 4109 are connected between the first power supply voltage VDD and a node 4121 via the PMOS transistor 4103, 4107, and 4111, respectively. The PMOS transistors in each of the PMOS transistor groups 4113 and 4117 are connected between the second power supply voltage 1/2VDD and a node 4121 via the PMOS transistors 4115 and 4119, respectively.

The gates of the PMOS transistors 4103, 4107, 4111, 4115, and 4119 are each connected to the ground voltage VSS. The impedance 4122 is connected between the node 4121 and a node 4123, and the voltage of the node 4123 is the second reference voltage VREF11H.

For example, when the PMOS transistor group 4101 responds to Zp and has an impedance of Z, each of the PMOS transistor groups 4105 and 4109 responds to 3Zp and has an impedance of Z, and each of the PMOS transistors 4113 and 4117 responds to 1.5Zp and has an impedance of 1.5Z, the value of the impedance 4022 is preferably 4Z. FIG. 15 illustrates levels of the second reference voltage VREF11H.

Figure 11:
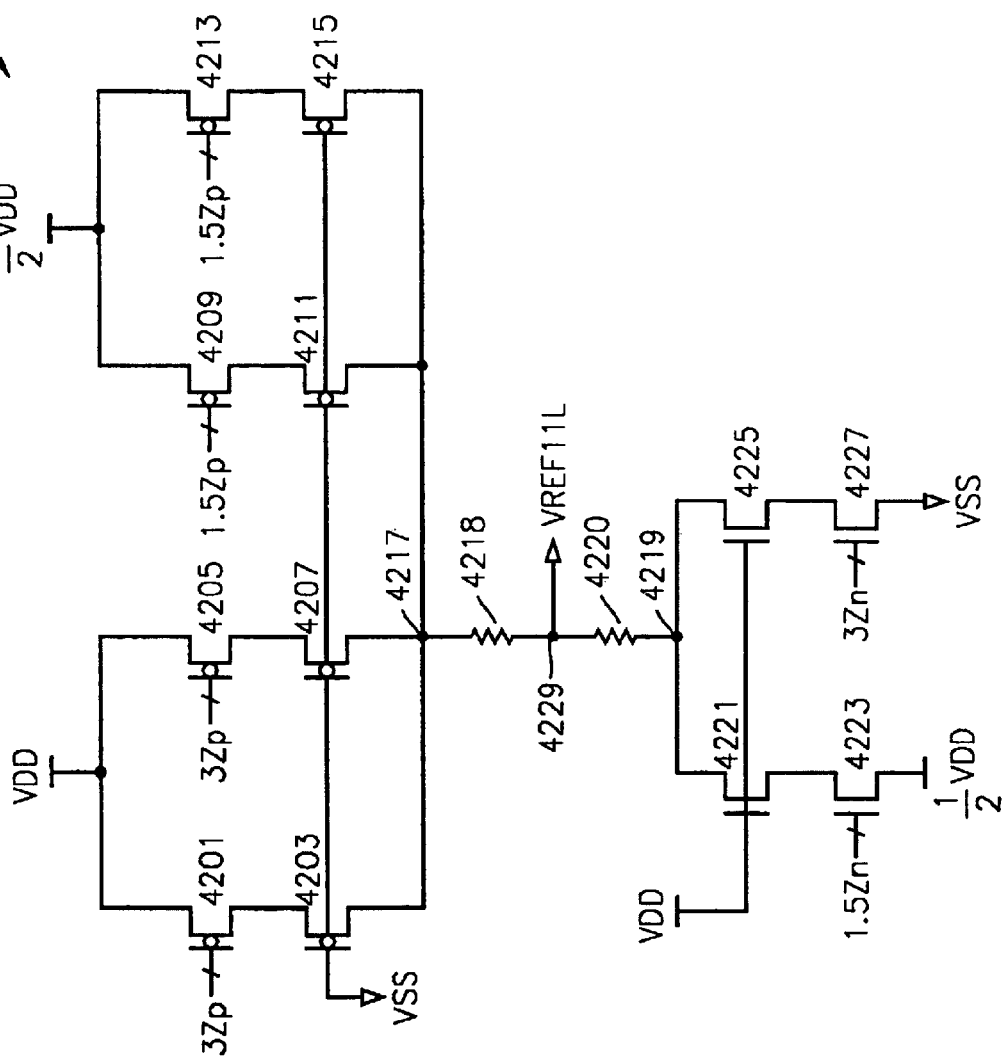
FIG. 11 is a circuit diagram of a third reference generating circuit.

FIG. 11 is a circuit diagram of a third reference voltage generating circuit. Referring to FIG. 11, the third reference voltage generating circuit 400_3 includes a plurality of PMOS transistor groups 4201, 4205, 4209, and 4213, a plurality of NMOS transistor groups 4223 and 4227, a plurality of MOS transistors 4203, 4207, 4211, 4215, 4221, and 4225, and a pair of impedances 4218 and 4220.

Referring to FIGS. 5, 7, and 11, the control signals 3Zp, 1.5Zp, 1.5Zn, and 3Zn, which are output from the impedance calibration circuit 200, are input to the gates of the corresponding MOS transistor groups 4201, 4205, 4213, 4223, and 4227, respectively.

The PMOS transistors in the PMOS transistor groups 4201 and 4205 are connected between the first power supply voltage VDD and a node 4217 via the PMOS transistors 4203 and 4207, respectively. The PMOS transistors in the PMOS transistor groups 4209 and 4213 are connected between the second power supply voltage 1/2VDD and the node 4217 via the PMOS transistors 4211 and 4215, respectively.

The gates of the NMOS transistors 4203, 4207, 4211, and 4215 are each connected to the ground voltage VSS.

The NMOS transistor group 4223 is connected between a node 4219 and the second power supply voltage 1/2VDD via the NMOS transistor 4221, and the NMOS transistor 4227 is connected between the node 4219 and the ground voltage VSS via the NMOS transistor 4225.

The gates of the NMOS transistors 4221 and 4225 are each connected to the first power supply voltage VDD. The impedance 4218 is connected between the node 4217 and a node 4229, and the impedance 4220 is connected between the node 4229 and the node 4219. The voltage of the node 4229 is the third reference voltage VREF11L.

For example, when each of the PMOS transistors 4201 and 4205 responds to 3Zp and has an impedance of 3Z, each of the PMOS transistors 4209 and 4213 responds to 1.5Zp and has an impedance of 1.5Z, the NMOS transistor 4223 responds to 1.5Zn and has an impedance of 1.5Z, and the NMOS transistor 4227 responds to 3Zn and has an impedance of 3Z, the value of each of the impedances 4218 and 4219 is preferably 4Z. FIG. 15 illustrates levels of the third reference voltage VREF11L.

Figure 12:
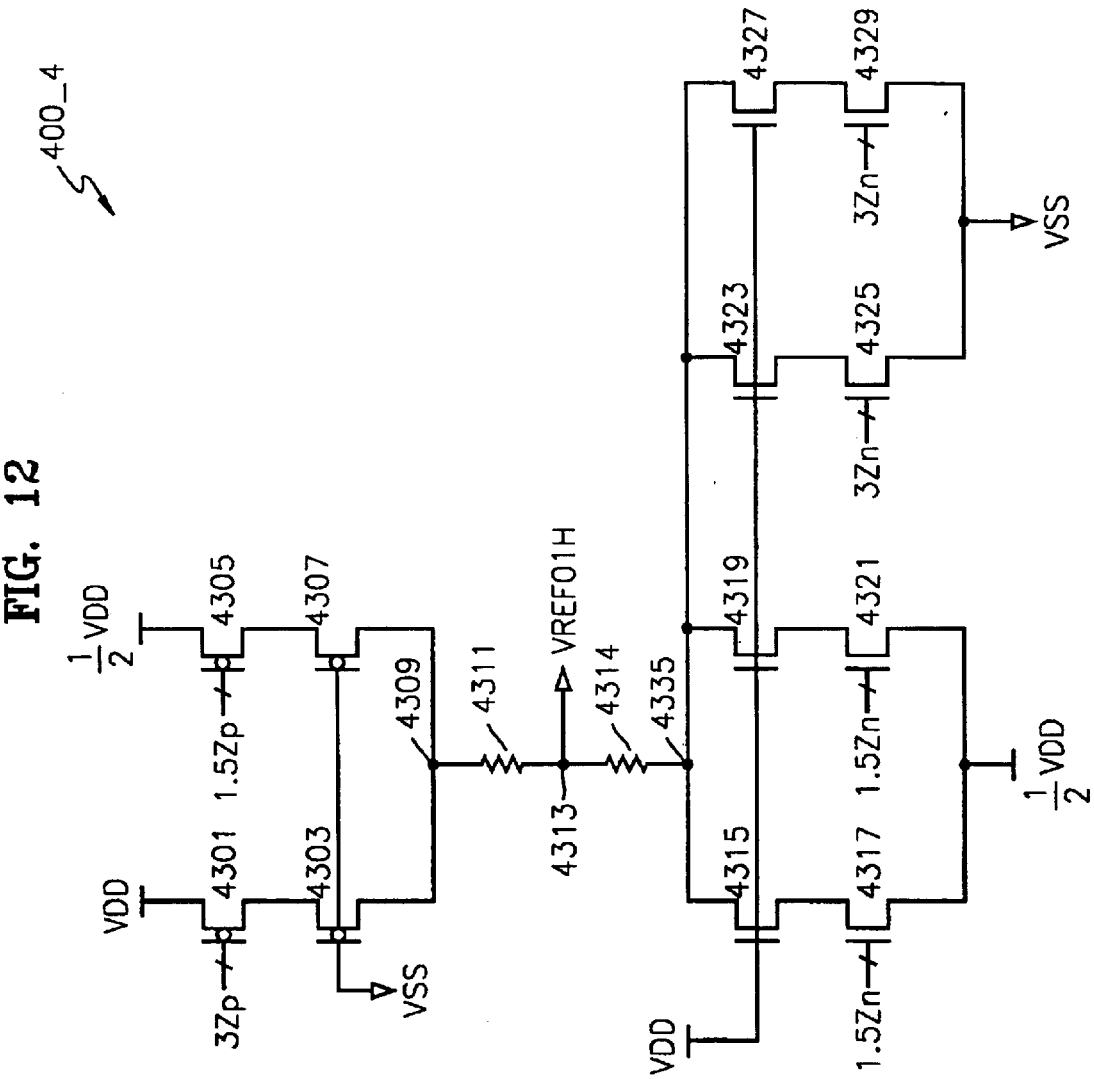
FIG. 12 is a circuit diagram of a fourth reference generating circuit.

FIG. 12 is a circuit diagram of a fourth reference voltage generating circuit. Referring to FIG. 12, the fourth reference voltage generating circuit 400_4 includes a plurality of PMOS transistor groups 4303 and 4307, a plurality of NMOS transistor groups 4317, 4321, 4325, and 4329, a plurality of MOS transistors 4303, 4307, 4315, 4319, 4323, and 4327, and a pair of impedances 4311 and 4314.

Referring to FIGS. 5, 7, and 12, the control signals 3Zp, 1.5Zp, 1.5Zn, and 3Zn, which are output from the impedance calibration circuit 200, are input to the gates of the corresponding MOS transistor groups 4303, 4307, 4317, 4321, 4325, and 4329, respectively.

The PMOS transistors in the PMOS transistor group 4301 are connected between the first power supply voltage VDD and a node 4309 via the PMOS transistor 4303. The PMOS transistors in the PMOS transistor group 4305 are connected between the second power supply voltage 1/2VDD and the node 4309 via the PMOS transistor 4307.

The gates of the PMOS transistors 4317 and 4321 are each connected to the ground voltage VSS.

The NMOS transistors in the NMOS transistor groups 4317 and 4321 are connected between a node 4335 and the second power supply voltage 1/2VDD via the NMOS transistor 4315 and 4319, respectively. The NMOS transistor groups 4325 and 4329 are connected between the node 4335 and the ground voltage VSS via the NMOS transistors 4323 and 4327, respectively.

The gates of the NMOS transistor groups 4315, 4319, 4323, and 4327 are connected to the first power supply voltage VDD. The impedance 4311 is connected between the node 4309 and a node 4313, and the impedance 4314 is connected between the node 4313 and the node 4335. The voltage of the node 4313 is the fourth reference voltage VREF01H.

For example, when the PMOS transistor group 4301 responds to 3Zp and has an impedance of 3Z, the PMOS transistor group 4305 responds to 1.5Zp and has an impedance of 1.5Z, each of the NMOS transistor groups 4317 and 4321 responds to 1.5Zn and has an impedance of 1.5Z, and each of the NMOS transistor groups 4325 and 4329 responds to 3Zn and has an impedance of 3Z, the value of each of the impedances 4311 and 4314 is preferably 4Z. FIG. 15 illustrates levels of the fourth reference voltage VREF01H.

Figure 13:
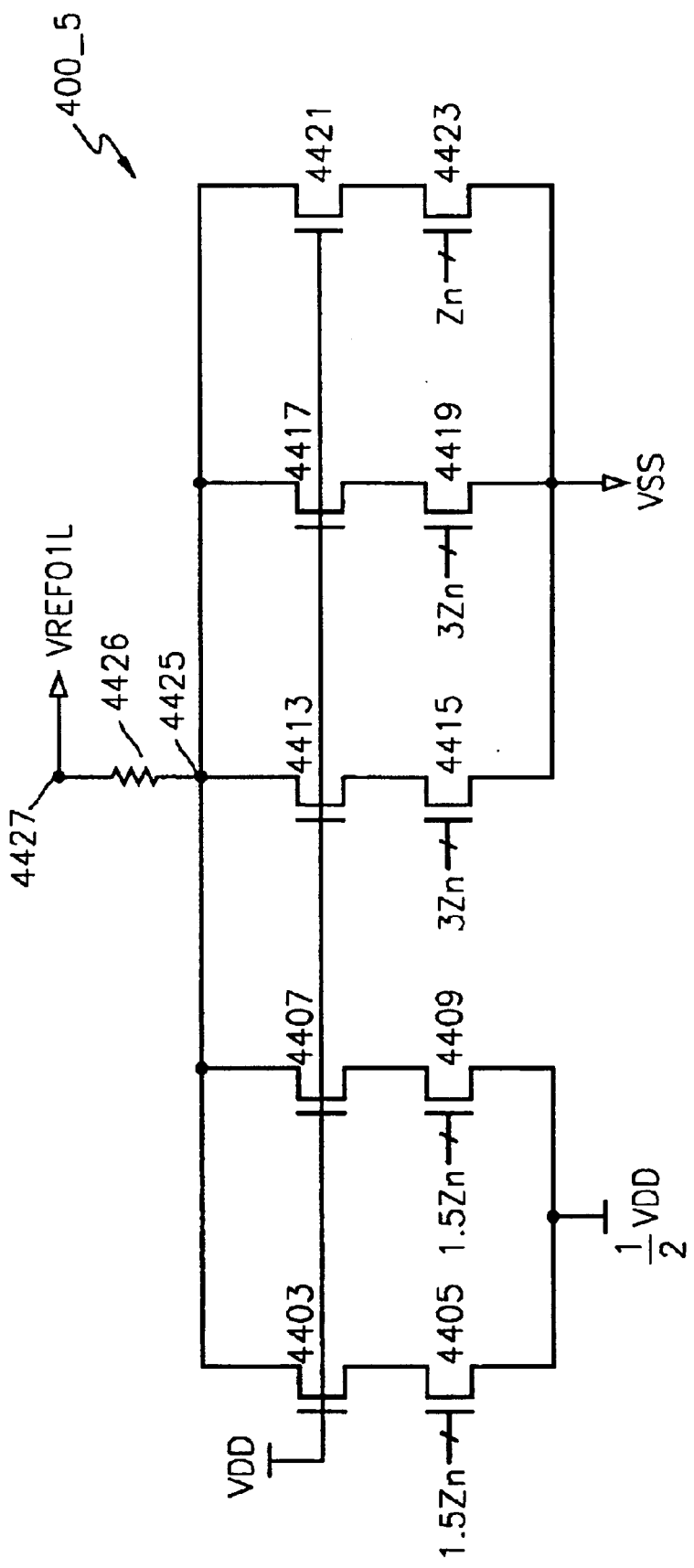
FIG. 13 is a circuit diagram of a fifth reference generating circuit.

FIG. 13 is a circuit diagram of a fifth reference voltage generating circuit. Referring to FIG. 13, the fifth reference voltage generating circuit 400_5 includes a plurality of NMOS transistor groups 4405, 4409, 4415, 4419, and 4423, a plurality of MOS transistors 4403, 4407, 4413, 4417, and 4421, and an impedance 4326.

Referring to FIGS. 5, 7, and 13, the control signals Zn, 1.5Zn, and 3Zn, which are output from the impedance calibration circuit 200, are input to the gates of the corresponding MOS transistor groups 4403, 4407, 4413, 4417, and 4421, respectively.

The NMOS transistors in the NMOS transistor groups 4405 and 4409 are connected between a node 4325 and the second power supply voltage 1/2VDD via the NMOS transistor 4403 and 4407, respectively. The gates of the NMOS transistors 4403 and 4407 are connected to the first power supply voltage VDD.

The NMOS transistors in the NMOS transistor groups 4415, 4419, and 4423 are connected between the node 4325 and the ground voltage VSS via the NMOS transistor 4413, 4417, and 4421, respectively.

The gates of the NMOS transistors 4413, 4417, and 4421 are connected to the first power supply voltage VDD.

For instance, when the NMOS transistor group 4423 responds to Zn and has an impedance of Z, each of the NMOS transistor groups 4405 and 4409 responds to 1.5Zn and has an impedance of 1.5Z, and each of the NMOS transistor groups 4415 and 4419 responds to 3Zn and has an impedance of 3Z, the value of the impedance 4326 is preferably 4Z. FIG. 15 illustrates levels of the fifth reference voltage VREF01L.

Figure 14:
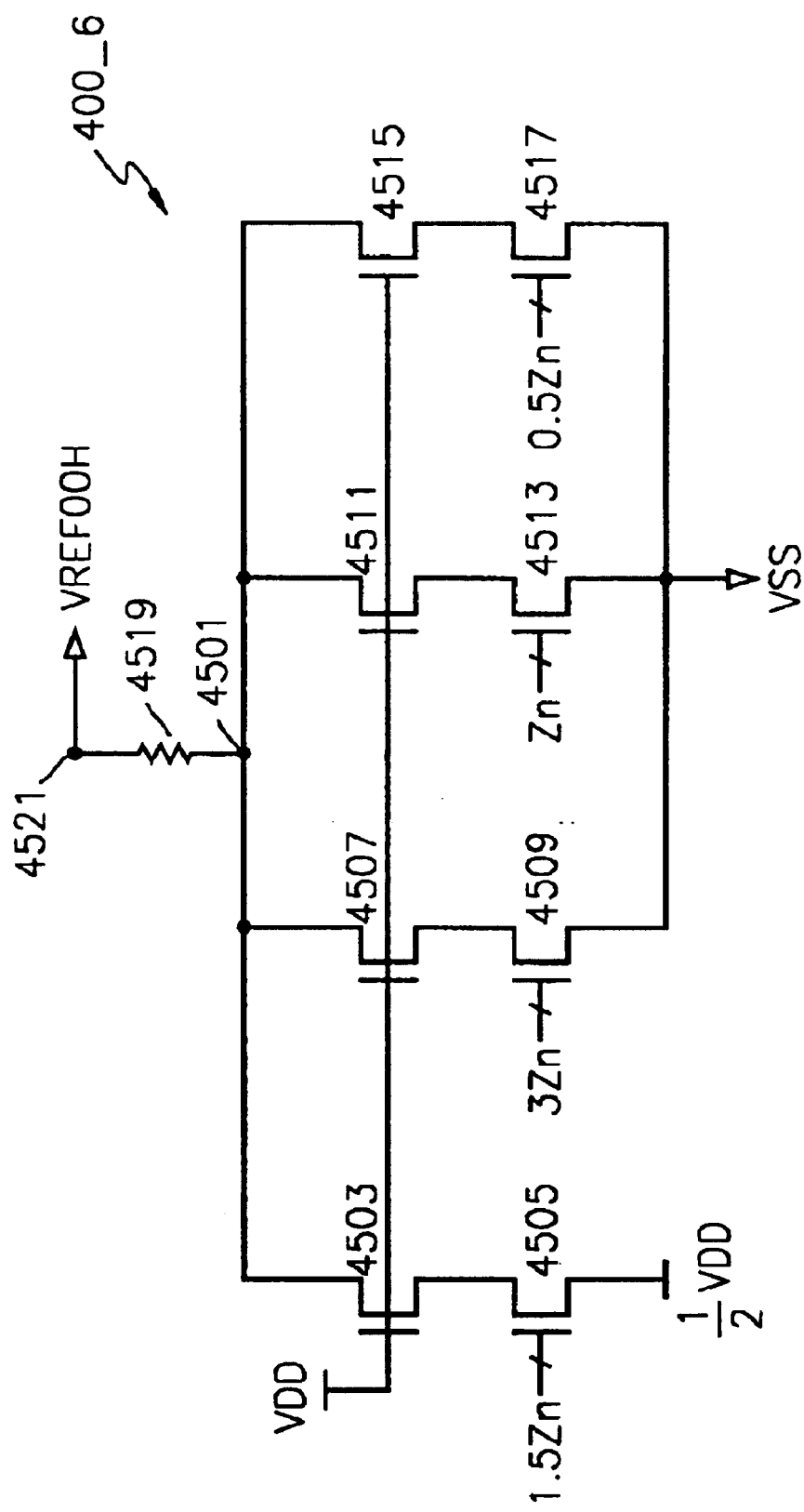
FIG. 14 is a circuit diagram of a sixth reference generating circuit.

FIG. 14 is a circuit diagram of a sixth reference voltage generating circuit. Referring to FIG. 14, the sixth reference voltage generating circuit 400_6 includes a plurality of NMOS transistor groups 4505, 4509, 4513, and 4517, a plurality of NMOS transistors 4503, 4507, 4511, and 4515, and an impedance 4519.

Referring to FIGS. 5, 7, and 14, the control signals 0.5Zn, Zn, 1.5Zn, and 3Zn, which are output from the impedance calibration circuit 200, are input to the gates of the corresponding MOS transistor groups 4505, 4509, 4513, and 4517, respectively.

The NMOS transistors in the NMOS transistor group 4505 are connected between the second power supply voltage 1/2VDD and a node 4501 via the NMOS transistor 4503. The NMOS transistors in the NMOS transistor groups 4509, 4513, and 4517 are connected between the ground voltage VSS and the node 4501 via the NMOS transistor 507, 4511, and 4515, respectively.

The gates of the NMOS transistors 4503, 4507, 4511, and 4515 are connected to the power supply voltage VDD.

For instance, when the NMOS transistor group 4505 responds to 1.5Zn and has an impedance of 1.5Z, the NMOS transistor group 4509 responds to 3Zn and has an impedance of 3Z, the NMOS transistor 4513 responds to Zn and has an impedance of Z, and the NMOS transistor group 4517 responds to 0.5Zn and has an impedance of 0.5Z, the value of the impedance 4519 is preferably 4Z. FIG. 15 illustrates levels of the sixth reference voltage VREF00H.

FIG. 15 illustrates levels and conditions of the first through sixth reference voltages. Referring to FIGS. 1 through 3 and 15, the condition 10⇔10 means that when the output signal LTXL of the output MUX 111 is 10 and the output signal RTXL of the output MUX 141 is 10, the voltage of the transmission line 130 is 10 (En10=VDD).

The condition 10⇔11 represents that when the output signal LTXL of the output MUX 111 is 10 and the output signal RTXL of the output MUX 141 is 11, the voltage of the transmission line 130 is 5/6VDD.

The condition 10//(10⇔11) represents that when the voltage of the transmission line 130 under the condition 10⇔10 is 10 and the voltage of the transmission line 130 under the condition 10⇔11 is 5/6VDD, the voltage of the transmission line 130 becomes a first reference voltage VREF10L.

The meaning of (11⇔11)v(10⇔01) is as follows. When the output signal LTXL of the output MUX 111 is 11 and the output signal RTXL of the output MUX 141 is 11, or when the output signal LTXL of the output MUX 111 is 10 and the output signal RTXL of the output MUX 141 is 01, the voltage of the transmission line is 11.

Since the remaining levels and conditions can be readily understood with reference to FIGS. 2, 3, and 15, a detailed description thereof will be omitted here.

Figure 16:
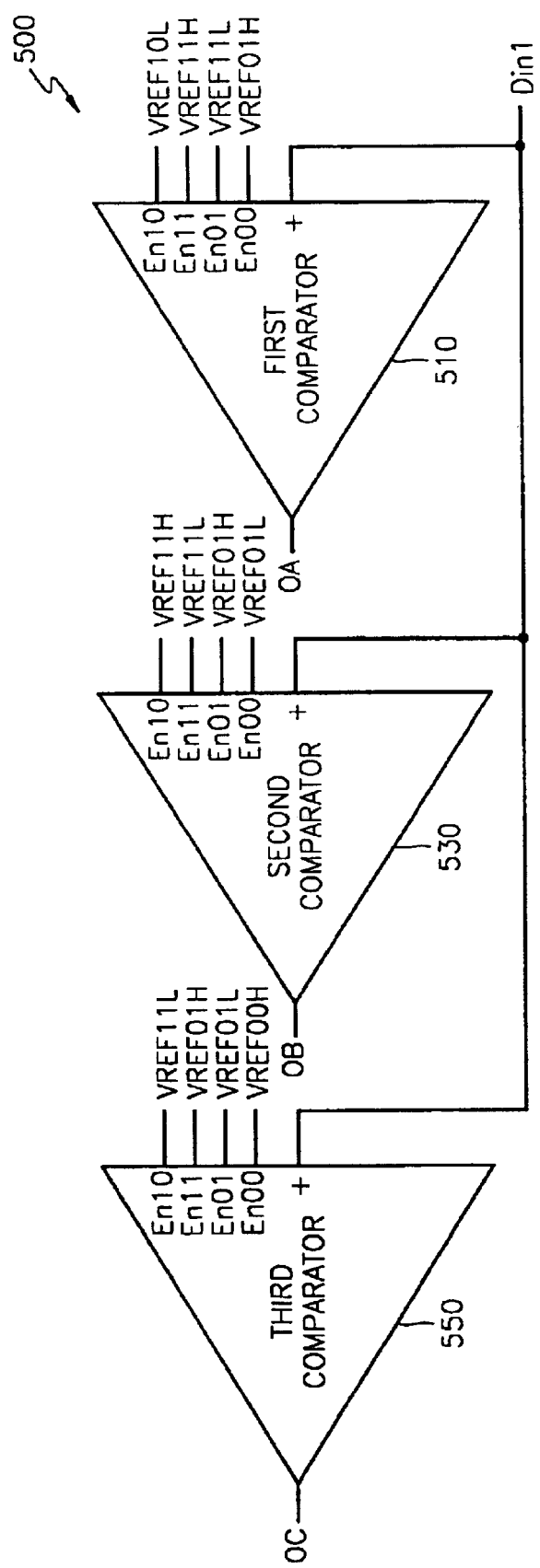
FIG. 16 illustrates the comparison circuit of the circuit of FIG. 8.

FIG. 16 illustrates the comparison circuit of FIG. 8. Referring to FIG. 16, the comparison circuit 500 includes a first comparator 510, a second comparator 530, and a third comparator 550.

Referring to FIGS. 1 and 16, each of the comparators 510, 530, and 550 selects one of the 6 reference voltages in response to the output signal LTXL, i.e., En10, En11, En01, or En00, of the output MUX 111, compares the selected reference voltage with the data Din1 input via the pad 121, and outputs the comparison result OA, OB, or OC to the input encoder 117.

Referring to FIGS. 1, 8, and 16, when the output signal LTXL of the output MUX 111 is En10, the first comparator 510 selects the first reference voltage VREF10L as a reference voltage, the second comparator 530 selects the second reference voltage VREF11H as a reference voltage, and the third comparator 550 selects the third reference voltage VREF11L as a reference voltage.

Accordingly, the first comparator 510 outputs the comparison result OA of comparing the first reference voltage VREF10L and the input data Din1, the second comparator 530 outputs the comparison result OB of comparing the second reference voltage VREF11H and the input data Din2, and the third comparator 550 outputs the comparison result of comparing the third reference voltage VREF11L and the input data Din1.

When the output signal LTXL of the output MUX 111 is En00, the first comparator 510 selects the fourth reference voltage VREF01H as a reference voltage, the second comparator 530 selects the fifth reference voltage VREF01L as a reference voltage, and the third comparator 550 selects the sixth reference voltage VREF00H as a reference voltage.

Accordingly, the first comparator 510 outputs the comparison result OA of the fourth reference voltage VREF01H and the input data Din1, the second comparator 530 outputs the comparison result OB of the fifth reference voltage VREF01L and the input data Din2, and the third comparator 550 outputs the comparison result OC of the sixth reference voltage VREF00H and the input data Din1.

Table 3 shows reference voltages of each of the comparators 510, 530, and 550 based on the output signal LTXL of the output MUX 111.

TABLE 3

| LTXL | VREF of first comparator | VREF of second comparator | VREF of third comparator |
|------|--------------------------|---------------------------|--------------------------|
| En10 | VREF10L | VREF11H | VREF11L |
| En11 | VREF11H | VREF11L | VREF01H |
| En01 | VREF11L | VREF01H | VREF01L |
| En00 | VREF01H | VREF01L | VREF00H |

FIG. 17 illustrates the output signals of the input encoder 117, 147 of FIG. 1. Referring to FIGS. 1, 16, and 17, when all the output signals OA, OB, and OC of the comparators are H (high), the input encoder 117 encodes the data ED2 and OD2 output from the second semiconductor device 140 and outputs the encoded data ED2 and OD2 to the memory device in response to the clock signals RCLK and RCLKB.

When the output signals OA, OB, and OC are L (low), H, and H, respectively, the input encoder 117 outputs 1 (ED2) and 1 (OD2). When the outputs OA, OB, and OC are L, L, and H, respectively, the input encoder 117 outputs 0 (ED2) and 1 (OD2). When the output signals OA, OB, and OC are L, L, and L, respectively, the input encoder 117 outputs 0 (ED2) and 0 (OD2).

Referring to FIGS. 1 through 17, when ED1 is 0, OD1 is 0, ED2 is 1, and OD2 is 0, the operations of the first semiconductor device 110 and the second semiconductor device 140 are as follows.

The output MUX 111 of the first semiconductor device 110 outputs En00 to the 4-level transmitter 113 in response to ED1 and OD1 The output driver 300 of the 4-level transmitter 113 outputs En00 to the transmission line 130 via the pad 121 and simultaneously the output MUX 141 of the second semiconductor device 140 outputs En10 to the 4-level transmitter 143 in response to ED2 and OD2. The output driver 300 of the 4-level transmitter 143 outputs En10 to the transmission line 130 via the pad 151. Therefore, the voltage level of the transmission line 130 is 0.5VDD.

The first comparator 510 of the receiver 115 compares the fourth reference voltage VREF01H selected as the reference voltage with the input data Din1 (=0.5VDD), and outputs a logic high value as the comparison result OA. The second comparator 530 compares the fifth reference voltage VREF01L selected as the reference voltage with the input data Din1 (=0.5VDD) in response to En00, and outputs a logic high value as the comparison result OB. The third comparator 550 compares the sixth reference voltage VREF00H selected as the reference voltage with the input data Din1 =0.5VDD, and outputs a logic high value as the comparison result OC.

Thus, the input encoder 117 outputs. ED2 having the value of 1 and OD2 having the value of 0 to the memory device in response to the clock signals RCLK and RCLKB. Accordingly, the first semiconductor device 110 exactly detects the data ED2 and OD2 transferred by the second semiconductor device 140.

At the same time, the first comparator 510 of the receiver 145 compares the first reference voltage VREF10L selected as the reference voltage with the received data Din2 (=0.5VDD), and outputs a logic low value as the comparison result OA. The second comparator 530 compares the second reference voltage VREF11H selected as the reference voltage with the received data Din2 (=05VDD) in response to En10, and outputs a logic low value as the comparison result OB. The third comparator 550 compares the third reference voltage VREF11L selected as the reference voltage with the received data Din2 (=0.5VDD) in response to En10, and outputs a logic low value as the comparison result OC.

Thus, the input encoder 147 outputs ED1 having the value of 1 and OD1 having the value of 0 to the memory device in response to the clock signals RCLK and RCLKB. Accordingly, the second semiconductor 140 exactly detects the data ED1 and OD1 transferred by the first semiconductor device 110.

As described above, the simultaneous bi-directional signal transmission system according to the present invention can simultaneously transmit and receive 4-level signals in both directions at high speed regardless of impedance mismatching between semiconductor devices, interference between transmission signals, distance of serial communication, and data skew.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. A simultaneous bi-directional signal transmission system comprising a first semiconductor device, a second semiconductor device, and at least one transmission line which connects the first and second semiconductor devices, wherein the first semiconductor device includes:
a first output MUX which receives a first binary data and converts the first binary data into a first signal having one of at least four levels;
a first transmitter which is connected to the first output MUX and outputs the first signal via the transmission line to the second semiconductor device;
a first receiver which compares at least one reference voltage selected by the first signal with a third signal input via the transmission line and outputs the comparison result; and
a first input encoder which detects a second binary data based on the comparison result output from the first receiver, and wherein the second semiconductor device includes;
a second output MUX which receives the second binary data and converts the second binary data into a second signal having one of at least four levels;
a second transmitter which is connected to the second output MUX and outputs the second signal via the transmission line to the fist semiconductor device;
a second receiver which compares at least one reference voltage selected by the second signal with the third signal input via the transmission line and outputs the comparison result; and
a second input encoder which detects the first binary data based on the comparison result output from the second receiver.

2. The system as claimed in claim 1, wherein the third signal is determined by a voltage level of the output first signal of the first transmitter and a voltage level of the output second signal of the second transmitter.

3. The system as claimed in claim 1, wherein the third signal level is a signal having one of 7 levels.

4. The system as claimed in claim 3, wherein the reference voltage is a voltage between one of the seven levels and one of the four levels.

5. The system as claimed in claim 1, wherein the first transmitter includes an output driver and an impedance calibration circuit,
wherein the impedance calibration circuit performs calibration when the first semiconductor device is initialized and outputs an N-bit control signal for matching the impedance of the output driver connected to the transmission line with the impedance of the transmission line,
and wherein the output driver calibrates its own impedance in response to the N-bit control signal and drives the first signal to the transmission line in response to the first binary data and a logic value corresponding to the first signal.

6. The system as claimed in claim 1, wherein the second transmitter includes an output driver and an impedance circuit,
wherein the impedance calibration circuit performs calibration when the second semiconductor device is initialized and outputs an N-bit control signal for matching the impedance of the output driver connected to the transmission line with the impedance of the transmission line,
and wherein the output driver calibrates its own impedance in response to the N-bit control signal, and drives the second signal to the transmission in response to the second binary data and a logic value corresponding to the second signal.

7. The system as claimed in claim 1, wherein the first receiver includes: a reference voltage generator which generates a plurality of reference voltages; and
a comparison circuit which selects a reference voltage from the plurality of reference voltages in response to the first signal, compares the selected reference voltage with the third signal, and outputs the comparison result.

8. The system as claimed in claim 7, wherein the second receiver includes: a reference voltage generator which generates a plurality of reference voltages; and
a comparison circuit which selects a reference voltage from the plurality of reference voltages in response to the second signal, compares the selected reference voltage with the third signal, and outputs the comparison result.

9. A semiconductor device comprising:
a pad;
an output MUX which receives a first binary data, converts the first binary data into an output signal having one of at least four levels;
a transmitter which is connected between the output MUX and the pad and drives the output signal via a transmission line, connected to the pad, to a signal transmission circuit;
a receiver which compares one or more reference voltages selected by the output signal with a signal received via the pad and outputs the comparison result; and
an input encoder which detects a second binary data output by the signal transmission circuit based on the comparison result of the receiver.

10. The semiconductor device as claimed in claim 9, wherein the transmitter includes an output driver and an impedance calibration circuit,
wherein the impedance calibration circuit performs calibration when the semiconductor device is initialized and outputs an N-bit control signal for matching the impedance of the output driver connected to the transmission line to the impedance of the transmission line, and wherein the output driver calibrates the impedance of the output driver in response to the N-bit control signal and drives the output signal to the transmission line in response to the first binary data and a logic value corresponding to the first signal.

11. The semiconductor device as claimed in claim 10, wherein the impedance calibration circuit includes:
a comparator which includes a first input terminal, a second input terminal, and an output terminal, compares a voltage of the first input terminal with the reference voltage input to the second input terminal, and outputs the comparison result,
a counter control circuit which is connected to the output terminal of the comparator and outputs a control signal based on the comparison result,
a counter which is connected to the counter control circuit and outputs the N-bit control signals that are up-count; and
a plurality of transistors, each of which is connected to a power supply voltage and the first input terminal of the comparator,
wherein each of the plurality of transistors is controlled in response to respective bits of the N-bit control signal,
and wherein the counter controls to hold a count value of the N-bit control signal in response to the control signal generated when the voltage of the first input terminal is equal to the reference voltage.

* * * * *